United States Patent [19]

Bramwell

[11] Patent Number: 4,589,449
[45] Date of Patent: May 20, 1986

[54] TRUNKING

[76] Inventor: David W. Bramwell, 4, Bosworth Grove. Prestatyn, Clwyd, North Wales, Wales

[21] Appl. No.: 644,214

[22] Filed: Aug. 23, 1984

[51] Int. Cl.$^4$ ............................................. F16L 9/22
[52] U.S. Cl. ..................................... 138/162; 138/92; 138/157; 138/166; 174/68 C; 174/101
[58] Field of Search ................. 138/115, 116, 92, 156, 138/157, 162, 164, 166, 168; 174/48, 49, 68 C, 97, 101

[56] References Cited

U.S. PATENT DOCUMENTS

| 1,158,378 | 10/1915 | Fullerton et al. | 138/162 |
| 3,403,220 | 9/1968 | Riedel et al. | 138/162 |
| 3,697,667 | 10/1972 | Pollak et al. | 138/157 X |
| 3,782,420 | 1/1974 | Kolb et al. | 138/157 X |
| 3,927,698 | 12/1975 | Johannsen | 138/162 |

FOREIGN PATENT DOCUMENTS

| 1236621 | 3/1967 | Fed. Rep. of Germany | 138/92 |
| 2313786 | 6/1975 | France | 174/101 |
| 2406327 | 6/1979 | France | 138/166 |
| 1009092 | 11/1965 | United Kingdom | 174/101 |
| 1021871 | 3/1966 | United Kingdom | 138/92 |
| 1493410 | 11/1977 | United Kingdom | 138/92 |

Primary Examiner—James E. Bryant, III
Attorney, Agent, or Firm—Andrus, Sceales, Starke & Sawall

[57] ABSTRACT

Trunking for services such as electric cables, telephone cable and the like. The trunking comprises an elongate channel member and an elongate cover member dimensioned and arranged releasably to engage and close the channel member. The channel member has a base wall and first and second opposed side walls having free, elongate edge regions. The cover member has a top surface terminating in longitudinal side wall portions shaped to fit over the free edge regions of the channel member. A connector for connecting two, spaced apart cover members on at least one length of channel member comprises opposed side walls joined by a top wall so dimensioned that the side walls are a sliding fit over the side walls of the channel member and cover member. The trunking may also include a cable retainer for retaining cable and the like in the channel member.

9 Claims, 8 Drawing Figures

TRUNKING

FIELD OF THE INVENTION

This invention relates to trunking for services such as electric cables, telephone cables and the like and concerns trunking comprising an elongate channel member and an elongate cover member arranged to be secured thereto.

British patent specification No. 1303433 (Australian patent specification No. 455072) discloses one example of cable trunking comprising an elongate channel member having a pair of longitudinally extending radiused corners from which a pair of opposed flanges extend towards one another to define a gap extending longitudinally of the channel member. A cover member is provided to close the gap. The longitudinal edge regions of the cover member are radiused similarly to the radiused corners of the channel member, but the inner radius thereof is slightly less than that of the corresponding outer surface of the radiused corners. Extending from the inner faces of the lid are two spaced, longitudinally extending projections which present convex outwardly extending faces dimensioned and arranged such that when the cover is offered-up to the channel member and pushed into place to close the gap, the convex projections operate with a snap action against the free ends of the flanges. The radiused outer edges of the cover also provide some holding engagement of the cover around the radiused corners of the channel member.

British Published Patent Aplication No. 2132421A (U.S. application Ser. No. 619,843) discloses another example of trunking comprising an elongate channel member and an elongate cover member dimensioned and arranged releasably to be engaged by the channel member. The channel member has opposed side walls each provided at a position spaced from its distal edge with an inwardly directed protrusion shaped to form with the internal surface of the wall extending to the distal edge a generally hook-shaped member to form first engagement means. The cover member is provided at or near each longitudinal edge with a flange having an inwardly directed protrusion to form second engagement means, the channel member and cover member being so dimensioned that, in use, the cover member can be placed on the channel member and snapped into engagement therewith by engagement of each second engagement means by a corresponding first engagement means.

SUMMARY OF THE INVENTION

According to the invention there is provided trunking comprising an elongate channel member and an elongate cover member dimensioned and arranged releasably to engage and close the channel member, the channel member having a base wall and first and second opposed side walls having free, elongate edge regions forming first engagement means, said cover member having longitudinal side wall portions shaped to fit over said free edge regions of said channel member and two elongate projections extending from the inner face thereof and substantially parallel to said longitudinal edge portions each longitudinal side wall portion and an associated one of said projections forming second engagement means, whereby said cover member can be placed on said channel member and snapped into engagement therewith by engagement of said second engagement means around said first engagement means.

Such trunking is suitable for straight runs but as it is manufactured in finite lengths it is often necessary to connect two lengths together or to make provision for T-junctions and direction changes.

According to a development of the invention there is provided connector means for connecting together two spaced apart cover members on at least one length of said channel member, the connector means comprising opposed side walls joined by a top wall so dimensioned that the side walls are a sliding fit over the side walls of said channel member and cover member.

If a substantial amount of cable is housed in the trunking, there may be a tendency for it to push off the cover member thus exposing the cable.

According to a further development of the invention the trunking is provided with retaining means for retaining cable and the like in said channel member.

BRIEF DESCRIPTION OF THE DRAWINGS

An embodiment of the invention will now be described by way of example with reference to the accompanying drawings in which.

DETAILED DESCRIPTION OF THE DRAWINGS

Figure 1:
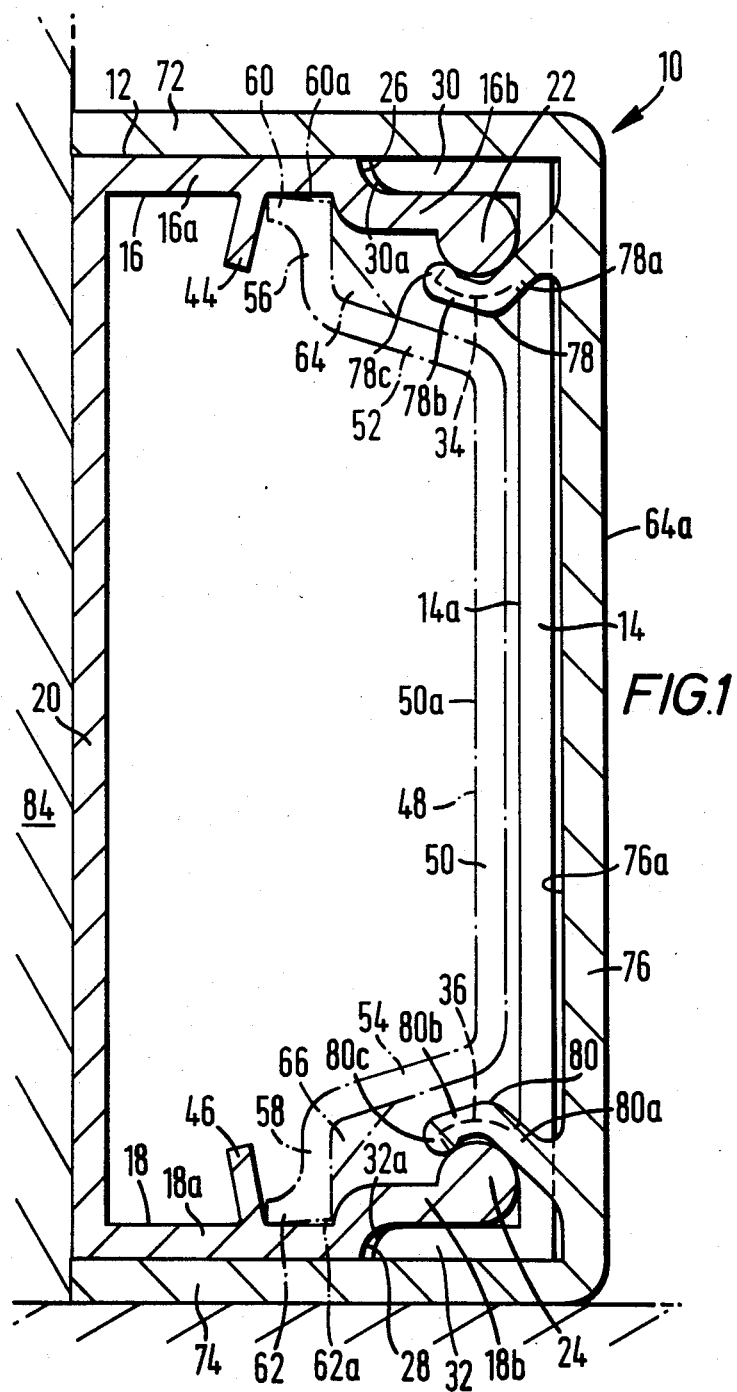
FIG. 1 shows an end elevation partly in cross-section of trunking with a connector member according to the invention.
Figures 2, 3:
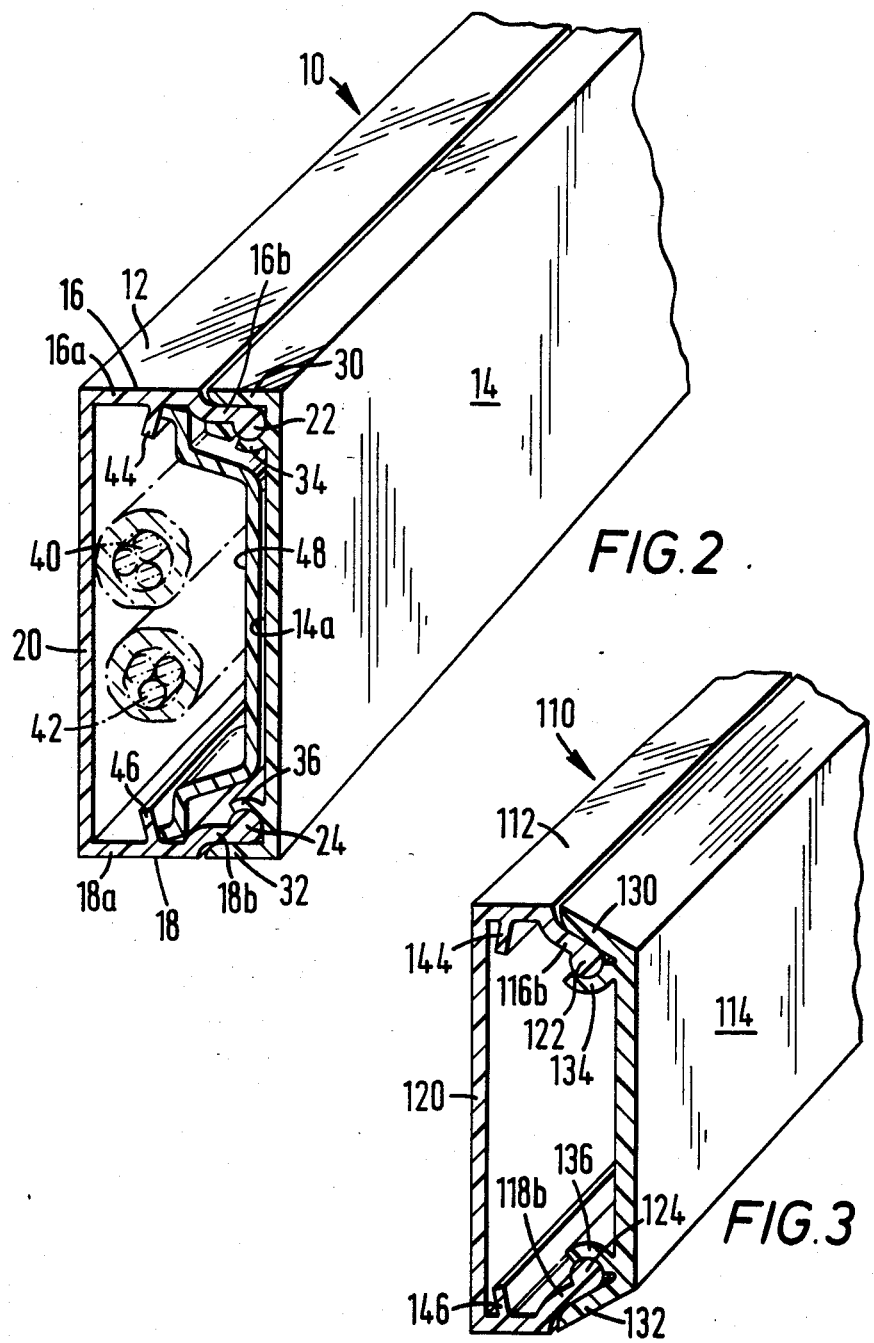
FIG. 2 shows a perspective view of the trunking of FIG. 1.
FIG. 3 shows a perspective view of another embodiment of trunking according to the invention.
Figure 4A:
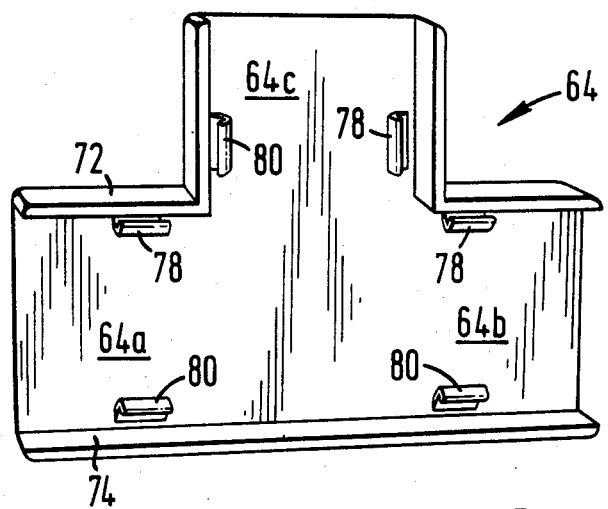
FIGS. 4a–d show various embodiments of connector members according to the invention.
Figure 4B:
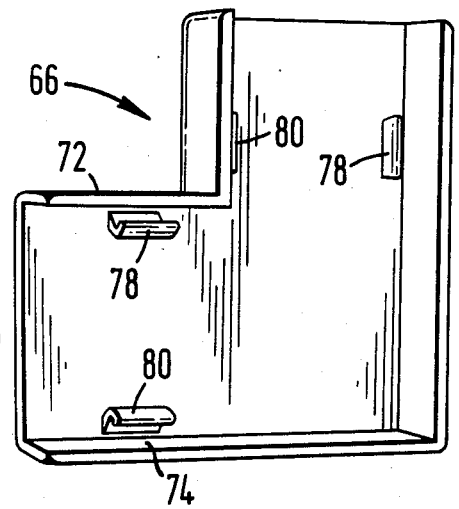
Figure 4C:
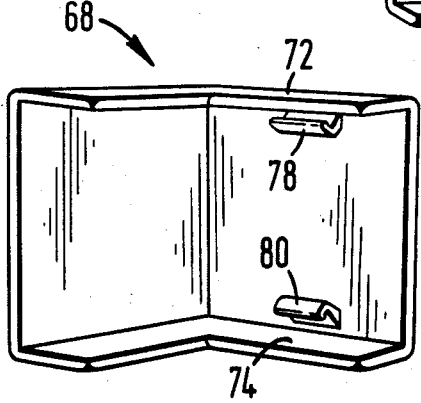
Figure 4D:
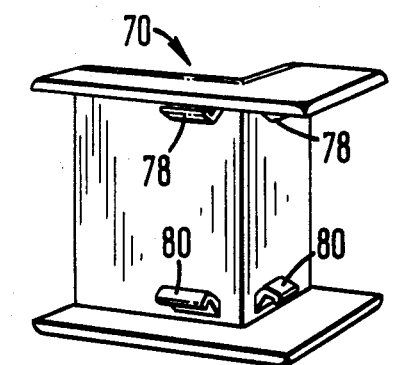

Referring to FIGS. 1 and 2 of the drawings, there is shown trunking 10 comprising an elongate channel member 12 and an elongate cover member 14 dimensioned and arranged releasably to engage and close the channel member 12. The channel member 12 and cover member 14 may be of a plastics material such as thermoplastics unplasticised polyvinylchloride (PVC) which has good insulating properties.

The channel member 12 has opposed side walls 16, 18 joined by a base wall 20. Each side wall 16, 18 has a first portion 16a, 18a extending substantially normal to the base 20, and a second portion 16b, 18b respectively which terminate in part circular beads 22, 24.

The wall portions 16b, 18b are stepped inwardly relative to the portions 16a, 18a by an amount approximately equal to the wall thickness of the cover member 14. The stepped junctions, or shoulders, between the portions 16a, 16b and 18a, 18b define abutment surfaces 26, 28. The portions 16b, 18b extend in a plane substantially parallel to the portions 16a, 18a. Each of the wall portions 16b, 18b with its bead 22, 24 define first engagement means for the cover 14.

The cover member 14 is provided with longitudinal edge portions, or side walls, 30, 32 so dimensioned that when the cover 14 is fitted on the channel 12, the external surfaces of the walls 30, 32 are substantially in the same plane as the external surfaces of the wall portions 16a, 18a respectively (as shown in FIG. 1) to provide the trunking 10 with smooth external lines.

Projecting from the inner face 14a of the cover member 14 are two elongate projections 34, 36 which extend in spaced parallel relation to their associated side walls 30, 32. The projections 34, 36 are of generally arcuate form, and present concave faces to their associated walls 30, 32 and, in combination, are dimensioned and arranged to define second engagement means for snap engagement with the first engagement means 16b, 22; 18b, 24.

In use, when the cover member 14 is presented to the channel member 12 and the parts pushed together, the side walls 30, 32 are guided down the external surfaces of wall portions 16b, 18b respectively and the free ends of the projections 34, 36 engage the curved bead portions 22, 24. As the gaps between the free ends of the projections 34, 36 and their associated wall portions 30, 32 are less than the effective diameter of the beads 22, 24, the projections 34, 36, being slightly resilient, open slightly to pass round their associated beads 22, 24 and then tend to close towards their original shape and this causes the cover to engage the channel member with a snap action. Thus, the first engagement means 16b, 22 and 18b, 24 of the channel member 12 are engaged by the second engagement means 30, 34 and 32, 36 respectively to secure the cover member 14 to the channel member 12.

By providing the projections 34, 36 with a concave, curved surface which engages the curved surfaces on the beads 22, 24 there is a natural tendency for the projections to pull the cover 14 towards the channel member.

Thus, there has been disclosed trunking which is simple to manufacture, effective in use, and in which the access gap for the introduction of cable, wiring and the like is a relatively large proportion of the width of the channel member.

In the described embodiment the wall portions 16b, 18b have been shown to extend almost parallel to the wall portions 16a, 18a. In FIG. 3 there is shown trunking 110 in which the corresponding wall portions 116b, 118b converge inwardly to a greater extent, so that they subtend an obtuse angle of about 140° or less with a corresponding change in the angle of the side walls 130, 132 of the cover member 114. This results in a corresponding reduction in the gap between the beads 122, 124 but facilitates the provision of a corner chamfer on the cover member without the need to reduce the thickness of its side walls. In other respects the trunking 110 is similar to that described with reference to FIG. 2.

In FIG. 2 there is shown in phantom, two cables 40, 42 for providing services such as electrical power, telephone or cable television signals. In the case of certain cable runs such as power and telephone it may be preferable or obligatory to run them in separate compartments within the channel member 12. Such a pair of compartments could be formed by a wall member (not shown) extending inwardly from the base wall 20.

In use, if a substantial amount of cable is housed in the trunking, there can be a tendency for it to push off the cover member 14 thus exposing the cable. To reduce this tendency there is provided cable retaining means. The cable retaining means comprises projections 44, 46 which extend inwardly and towards the base 20 from the walls 16a, 18a respectively. The projections 44, 46 extend conveniently along the full length of the channel member 12 although they could, of course, be provided at intervals along its length. The other part of the cable retaining means is a generally channel-shaped cable retainer 48 which is positioned as shown in FIGS. 1 and 2. A single, long retainer 48 could be used but it is found convenient to use a plurality of relatively short lengths, say one to several cm long, positioned at intervals along the channel 14.

The retainer 48 has a generally planar main wall portion 50 which is positioned in spaced parallel relation to the cover member 14. The portion 50 is formed with side walls 52, 54 which extend at an angle of about 85° to the portion 50 and then turn outwardly at 56, 58 substantially parallel to portion 50 and terminate in feet 60, 62 having end surfaces 60a, 62a respectively substantially normal to the portion 50.

Webs 64, 66 are provided between wall portions 52, 56 and 54, 58 respectively for added rigidity.

It will be noted that the end surfaces 60a, 62a of the cable retainers are at a slight angle to the inner surface of the walls 16, 18 respectively. If the volume of cable in the channel 12 is such that in the absence of retainers 48 it would normally push against the cover member 14 and perhaps push it off, such pressure will now be exerted against the surface 50a of the retainer and tend to bow out the wall portion 50. As the portion 50a bows outwardly, corresponding distortions in the rest of the retainer 48 force the end surfaces 60a, 62a of the feet 60, 62 against the walls 16, 18 respectively to form a relatively rigid structure. The dimensions of the feet 60, 62 and the spacings between the projections 44, 46 and the convex surfaces of walls 16b, 18b respectively ensure that the retainer 48 is clamped tightly in position to retain the cables.

The trunking 10 so far described is suitable for straight runs but as it is manufactured in finite lengths it may be necessary to connect two lengths together or to make provision for T-junctions and direction changes.

Figure 5:
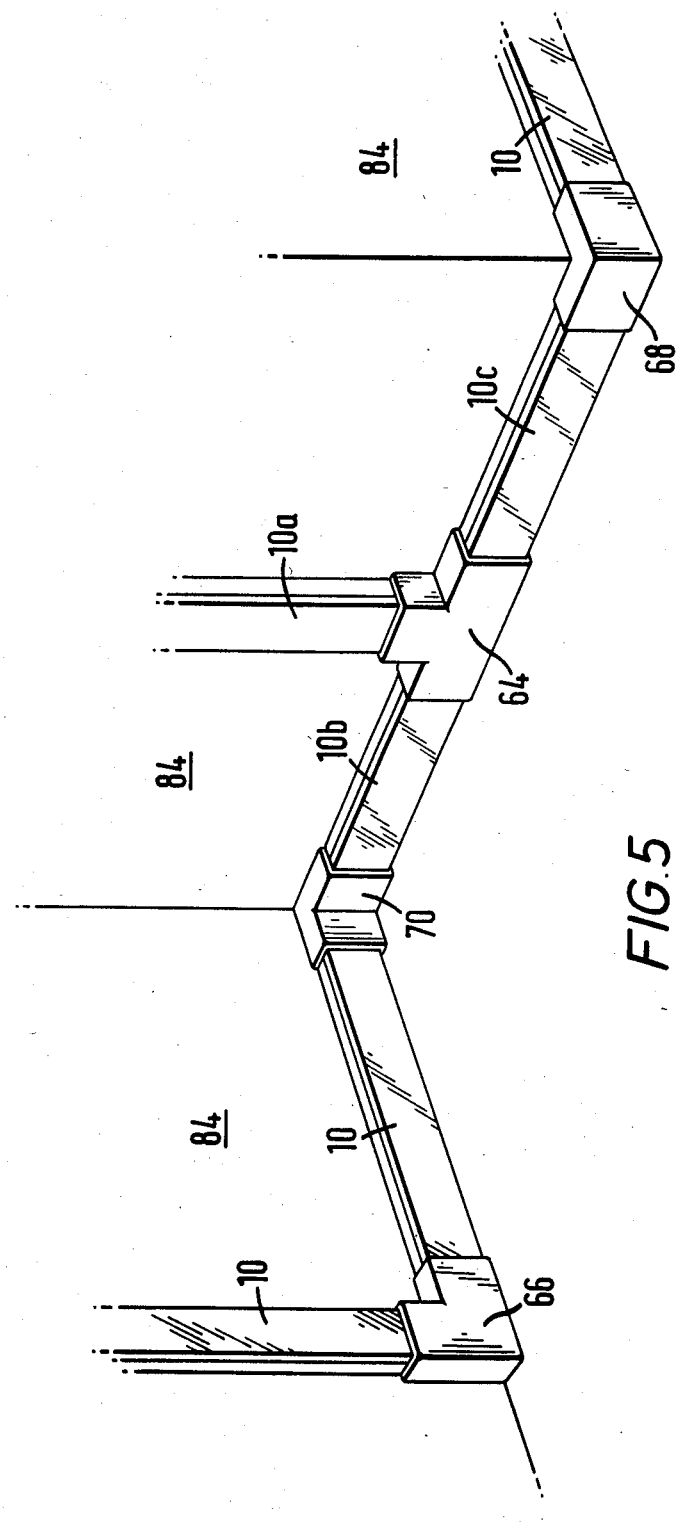
FIG. 5 is a schematic view of a trunking system embodying trunking and connectors according to the invention.

FIG. 4 shows various connector members 64 to 70 for use with a T-junction or for a change of direction, and FIG. 5 is a schematic diagram of a simple system illustrating the use of trunking and connector members according to the invention. For example FIG. 4 (a) shows a connector member 64 for a T-junction for covering three lengths of trunking 10a, 10b, 10c meeting in the form of a Tee (FIG. 5). FIG. 1 shows, in cross-section, a part, say part 64a of connector 64, fitted on a length of trunking. The connector members may be of a plastics material such as thermoplastics unplasticised polyvinylchloride (PVC) which has good insulating properties.

The principle of operation of the connectors 64-70 is generally similar and so explanation will be confined to the portion 64a as fitted to the trunking in FIG. 1.

The portion 64a has opposed side walls 72, 74 joined by a top wall 76. So dimensioned that the connector walls 72 and 74 are a sliding fit down the external surfaces of walls 16, 30 and 18, 32 respectively. Projecting from the inner face 76a of top wall 76 are two opposed short projections 78, 80 which extend in spaced parallel relation to their associated side walls 72, 74. The projections 78, 80 have a first portion 78a, 80a which extends inwardly and a second portion 78b, 80b which extends outwardly to terminate in a bead 78c, 80c and present generally concave faces to their associated walls 72, 74. The projections 78, 80 could also be of generally arcuate form such as the projections 34, 36 on the cover member 14 or any other suitable shape which facilitates a snap action engagement with the beads 22, 24 on the channel member 12.

In use where two lengths of trunking extending in line are to be connected by a connector member, the cover members 14 of each length of trunking are terminated at positions where they will not interfere with the projections 78, 80, as shown in phantom in FIG. 1. The connector would then be placed over the spaced ends of the cover members 14 and pushed downwardly until the projections 78, 80 engage the beads 22, 24 with a snap action. In the case of a T-connection the portions 64a, 64b of connector 64 would engage the in-line trunking 10c, 10b of FIG. 5 and the portion 64c would engage the trunking 10a extending normally thereto. Thus the connector 64, or one of the connectors 66 to 70 or similar as the application may require, can be used to make a quick, simple, neat and efficient cover and connector for two or more lengths of trunking.

The length of the walls 72, 74 of the connector members could be such that they extend down the trunking 10 towards the wall 84 or the like to which the trunking is attached a sufficient distance to cover the junction between the channel member 12 and cover member 14. However, it provides a neater appearance if the walls 72, 74 extend to the wall 84. Furthermore, if the walls 72, 74 are slightly longer so that they abut the wall 84 it is found that the upward pressure on the connector forces the beads 78c, 80c against the undersurface of the beads 22, 24 to provide a tighter fit which reduces the tendency for the connector member to move or rattle.

Connector members for use with trunking having a cross-section other than square or rectangular, such as that shown at FIG. 3 of the drawings could be profiled appropriately.

I claim:

1. Trunking comprising an elongate channel member, an elongate cover member, the cover member releasably engaging and closing the channel member, the channel member having a base wall and first and second opposed side walls having free, elongate edge regions, said cover member having a top surface terminating in longitudinal side wall portions shaped to fit over said free edge regions of said channel member, connector means for connecting two, spaced apart cover members on at least one length of channel member, the connector means comprising opposed side walls joined by a top wall so dimensioned that the opposed side walls are a sliding fit over both the opposed side walls of said channel member and the opposed side walls of said cover member, said elongate edge regions of said channel member forming first engagement means for engaging said cover member, said cover member being provided with two elongate projections extending from the inner face thereof and substantially parallel to said longitudinal side wall portions, each longitudinal side wall portion and an associated one of said projections forming second engagement means for engaging the first engagement means, whereby said cover member can be placed on said channel member and snapped into engagement therewith by engagement of said second engagement means around said first engagement means, each side wall of said channel member having a first wall portion extending substantially normal to said base wall and a second wall portion including the elongate edge region spaced inwardly of said first wall portion such that when the channel member is closed by the cover member the external surfaces of the corresponding first portion of a wall of the channel member and a longitudinal edge portion of the cover member are in contiguous relationship, and the trunking further comprising retaining means for retaining cable and the like in said channel member, said retaining means comprising a longitudinal projection extending inwardly from each of said opposed side walls of said channel member and substantially parallel to said base wall arranged to support a cable retaining member extending across the channel member, and the cable retaining member is generally channel shaped having a generally planar central wall portion which is, in use, positioned in spaced-parallel relation to the top surface of said cover member, and side walls which extend from said generally planar central wall portion and are provided with edge portions engageable with said longitudinal projections.

2. Trunking according to claim 1, in which the second wall portions of the channel member are stepped inwardly of their first wall portions to define abutment surfaces for the longitudinal edge portions of the cover member.

3. Trunking according to claim 1, in which the elongate projections extending from the inner face of said cover member present concave faces towards their associated longitudinal side wall portions to provide a snap-fit engagement with their associated first engagement means.

4. Trunking according to claim 1, in which the first engagement means comprises a part-circular bead formed along the free end of each side wall and of radius greater than the thickness of said side wall.

5. Trunking according to claim 4, in which said projections are of arcuate form of radius approximately equal to the radius of said bead.

6. Trunking according to claim 1, wherein said longitudinal projections and said second wall portions of said channel member are dimensioned and arranged to provide a receptacle for receiving the edge portions of said cable retaining member.

7. Trunking according to claim 6, wherein the longitudinal projections extend both inwardly and towards the base wall of said channel member.

8. Trunking according to claim 1, wherein the connector means is provided with third engagement means for snap engagement with said first engagement means on said channel member.

9. Trunking according to claim 8, wherein it has a side dimension, wherein it is attached to a substrate and wherein the opposed side walls of said connector means are slightly longer than the side dimension of the trunking, whereby the distal edges of the opposed side walls of the connector abut the substrate whereby the third and first engagement means effect a rigid connection.

* * * * *

UNITED STATES PATENT AND TRADEMARK OFFICE
CERTIFICATE OF CORRECTION

PATENT NO. : 4,589,449

DATED : May 20, 1986

INVENTOR(S) : David W. Bramwell

It is certified that error appears in the above-identified patent and that said Letters Patent is hereby corrected as shown below:

On the title page insert:

--(73) Assignee: EGA Limited, North Wales --.

Signed and Sealed this

Thirtieth Day of September 1986

[SEAL]

Attest:

DONALD J. QUIGG

Attesting Officer

Commissioner of Patents and Trademarks